United States Patent [19]

Denz

[11] 4,009,731
[45] Mar. 1, 1977

[54] PIVOTING DISCHARGE FOR SANITARY FLOW FITTINGS

[75] Inventor: Paul Denz, Lendringsen, Germany

[73] Assignee: Friedrich Grohe Armaturenfabrik, Hemer, Germany

[22] Filed: July 14, 1975

[21] Appl. No.: 595,870

[30] Foreign Application Priority Data

July 15, 1974 Germany .......................... 2433915

[52] U.S. Cl. ................................. 138/37; 138/155; 285/282; 403/112
[51] Int. Cl.² ...................... F16L 9/22; F16L 25/00
[58] Field of Search ............... 138/37, 44, 45, 155, 138/178, 177; 285/272, 282, 273–281, 7, 31, 122, 184, 314; 403/111–113

[56] References Cited

UNITED STATES PATENTS 2,242,303  5/1941  Irmischer ........................... 285/282

FOREIGN PATENTS OR APPLICATIONS 250,259  3/1965  Austria
857,179  12/1960  United Kingdom ............... 285/282

Primary Examiner—Harry N. Haroian
Assistant Examiner—John W. Shepperd
Attorney, Agent, or Firm—J. B. Raden; M. M. Chaban

[57] ABSTRACT

Tubular discharge bodies are provided for sanitary flow fittings. The discharge bodies are provided with an annular fitted element which may be placed in two settings or removed to enable three different pivoting ranges of 0°, 90° or 360°.

5 Claims, 1 Drawing Figure

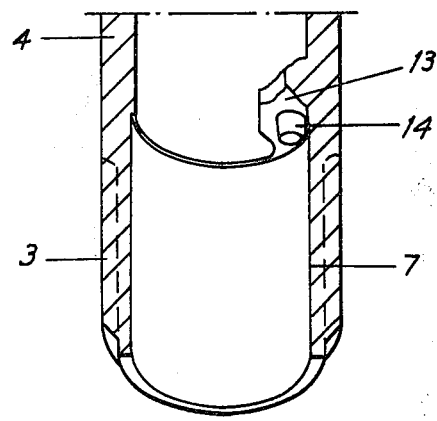
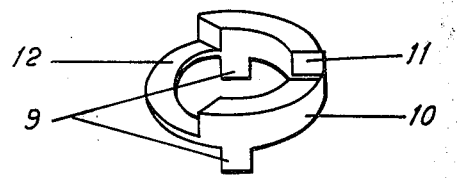
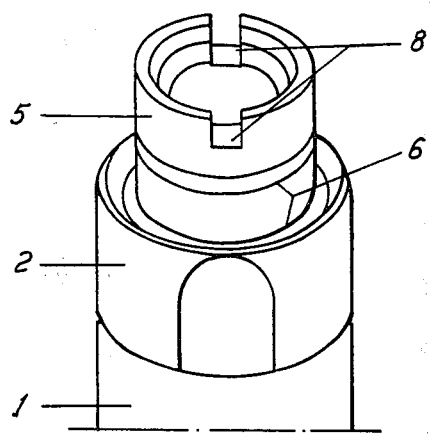

PIVOTING DISCHARGE FOR SANITARY FLOW FITTINGS

BACKGROUND OF THE INVENTION

1. Field of the Invention.

The present invention relates to a pivot restriction for tubular discharge bodies and particularly to a pivot restriction for sanitary flow fittings.

2. Description of the Prior Art.

The German printed publication of the unexamined application No. 2,161,762 describes a discharge device the pivoting range of which is limited by means of a recess in the holding nipple for engagement of a stud from the flow fitting casing. In addition to this, the German utility Model No. 1 974 595 shows a pivoting discharge the pivoting range of which is restricted by means of a radial pin arranged on the discharge tube, the pin sliding in a recess on the flow fitting body.

It is a particular disadvantage of these pivoting discharges that the pivoting range is established at the factory so that there is no possibility of varying the pivoting range at the final location. More recently this disadvantage has become more significant because some countries have issued regulations specifying a maximum pivoting range.

SUMMARY OF THE INVENTION

It is an object of the present invention to provide an adjustable pivoting range for sanitary flow fittings.

The invention achieves this object through the use of an annular fitting piece on the pivoting connection between discharge and flow fitting so that the pivoting range may be set as required.

This annular fitting piece provides a simple means for operating the pivoting discharge, say, in three different pivoting ranges, viz.

1. The discharge may be fixed to the flow fitting by a recess matching a fitting pin so that no pivoting is possible;
2. A restricted pivoting range may be set with the help of a curved recess opposite the first recess;
3. The discharge may be pivoted without any restriction by omitting the annular fitting element.

BRIEF DESCRIPTION OF THE DRAWINGS

A typical embodiment is shown expanded in the drawing and described in greater detail in the following.

DESCRIPTION OF A PREFERRED EMBODIMENT

A pivoting discharge 1 may be fastened to a sanitary flow fitting, or discharge connection, 4 by means of union nut 2 using threads 3 of the discharge connection 4. For perfect sealing, a tube end 5 is arranged on a discharge pipe, or discharge element, 1, the tube end 5 being inserted into bore 7 of the discharge connection 4, using sealing rings 6. The face of the tube end 5 includes fitting grooves 8 for positive connection to an annular fitting piece 10 equipped with cams 9.

For use in restricting the pivoting motion of the discharge pipe, the annular fitting piece 10 includes a recess 11 on its face opposite the cams 9 for fixing the discharge pipe and a further recess 12 for restricted pivoting of the discharge pipe.

Arranged on the wall within bore 7 is a flanged piece 13 which supports a locking and stopping pin 14. The pin 14 has a conical end projecting from the piece 13 with the result of pressure being exerted between recess 11 and pin 14 when the discharge is fixed providing a no-clearance pivoting stop between discharge connection 4 and the annular fitting piece 10.

The pivoting discharge pipe is installed in the following manner: The annular fitting piece 10 is placed with its cams 9 in grooves 8 of discharge pipe 1 before being introduced with the latter into bore 7 of connection 4 to be secured to the flow fitting body with the help of union nut 2. In the process, pin 14 slips into recess 11 of the annular fitting piece, fixing the discharge pipe 1. If the annular fitting piece 10 is re-located (turned through 180°) on tube end 5, pin 14 slips into recess 12, permitting restricted pivoting, say, through 90°. If the annular fitting piece 10 is omitted or removed, discharge pipe 1 may be pivoted through 360°.

While the principles of the invention have been described above in connection with specific apparatus and applications, it is to be understood that this description is made only by way of example and not as a limitation on the scope of the invention.

I claim:

1. A tubular discharge fitting assembly comprising in combination, a discharge tube member, a discharge fitting member mounted adjacent the output end of said discharge tube member allowing detachment of the fitting member from the tube member, and a ring insertable removably between said tube member and said fitting member allowing flow from said tube member through the ring and the fitting member; and further including means on one of said members mating with an irregular portion of said ring to prevent relative rotation between the ring and the one member, means on the other member mating with a further irregular portion of the ring for deterring relative rotation between said ring and said other member within a predetermined angular orientation of said other member and said ring, said further irregular portion on said ring allowing relative rotation between said ring and said other member through an arc of predetermined extent, whereby rotation of the fitting member relative to the tube member is controlled by said relative rotation.

2. A discharge fitting assembly as claimed in claim 1, wherein said further irregular portions of said ring includes a first recessed area in one axial face of said ring extending through an arc of said predetermined angular orientation.

3. A discharge fitting assembly as claimed in claim 2, in which there is a second area in said one axial face which is further recessed relative to said first recessed area for mating with a rotation deterring member affixed to said tube member.

4. A discharge fitting assembly as claimed in claim 3, in which said fitting member includes a tubular end which extends into the tube member to mate therein with said irregular portion of said ring which comprises a concentric axial face of said ring with said ring positioned within said tube member to provide said rotation prevention in a manner allowing ready detachment of said fitting member.

5. A discharge fitting assembly as claimed in claim 4, in which said tubular end includes an insert in the axial end face thereof for receiving a cam on said concentric axial face of said ring to provide said rotation preventing means.

* * * * *